(12) United States Patent
Vogt

(10) Patent No.: US 8,794,575 B2
(45) Date of Patent: Aug. 5, 2014

(54) QUICK CLAMPING APPARATUS FOR OPTICAL DEVICES

(76) Inventor: Philippe Vogt, Bussieres (FR)

( * ) Notice: Subject to any disclaimer, the term of this patent is extended or adjusted under 35 U.S.C. 154(b) by 241 days.

(21) Appl. No.: 13/392,020

(22) PCT Filed: Aug. 4, 2010

(86) PCT No.: PCT/EP2010/061356
§ 371 (c)(1),
(2), (4) Date: Feb. 23, 2012

(87) PCT Pub. No.: WO2011/023511
PCT Pub. Date: Mar. 3, 2011

(65) Prior Publication Data
US 2012/0145864 A1 Jun. 14, 2012

(30) Foreign Application Priority Data

Aug. 25, 2009 (DE) .................. 10 2009 038 823

(51) Int. Cl.
*F16M 11/04* (2006.01)
(52) U.S. Cl.
USPC .................. 248/177.1; 248/187.1; 248/316.2; 396/419; 396/428
(58) Field of Classification Search
CPC ... F16M 11/04; F16M 11/041; F16M 11/043; F16M 11/045; G02B 7/00; G02B 7/003; G02B 7/004; G03B 17/56; G03B 17/561; G03B 17/566
USPC ............... 248/316.2, 224.31, 222.13, 223.31, 248/228.5, 230.5, 231.61, 231.85, 316.6, 248/177.1, 178.1, 187.1; 396/329, 428, 419
See application file for complete search history.

(56) References Cited

U.S. PATENT DOCUMENTS

| 2,671,392 A |   | 3/1954  | Robins              |
|-------------|---|---------|---------------------|
| 2,840,334 A | * | 6/1958  | Cauthen ..... 248/187.1 |
| 3,006,052 A |   | 10/1961 | Stickney et al.     |
| 3,123,330 A |   | 3/1964  | Forbes-Robinson     |

(Continued)

FOREIGN PATENT DOCUMENTS

| DE | 7235189 U  | 3/1974  |
|----|------------|---------|
| DE | 8609247 U1 | 12/1987 |

(Continued)

OTHER PUBLICATIONS

Really Right Stuff: Catalogue 2009 [Online] URL:http:reallyrightstuff.com/mmRRS/Others/ReallyRightStuff2009.pdf.

(Continued)

*Primary Examiner* — Anita M King
(74) *Attorney, Agent, or Firm* — Gardner, Linn, Burkhart & Flory, LLP

(57) ABSTRACT

A quick-release device for clamping a quick-change plate of an optical device in a guide on a baseplate, the quick-change plate and the guide comprising complementarily formed guide surfaces, the guide comprising first and second mounting elements adjustable relative to each other, and a device for fixing the quick-change plate in place designed for adjusting the distance of the mounting elements to each other, characterized in that the device for fixing the quick-change plate in place comprises a lever engaging with a cam in a slotted link disposed in the first mounting element, such that a motion of the lever adjusts the first mounting element relative to the second mounting element.

21 Claims, 4 Drawing Sheets

(56) References Cited

U.S. PATENT DOCUMENTS

| | | | |
|---|---|---|---|
| 3,128,982 A | | 4/1964 | Christopher |
| 3,429,543 A | * | 2/1969 | Mooney .................. 248/346.04 |
| 3,549,113 A | * | 12/1970 | Pagliuso .................... 248/187.1 |
| 3,612,462 A | | 10/1971 | Mooney et al. |
| 3,628,761 A | * | 12/1971 | Thomas, Jr. ............... 248/184.1 |
| 3,737,130 A | | 6/1973 | Shiraishi |
| 3,782,671 A | | 1/1974 | Igwe |
| 3,855,602 A | | 12/1974 | Hoos |
| 4,319,825 A | | 3/1982 | Newton |
| 4,473,177 A | | 9/1984 | Parandes |
| 4,752,794 A | | 6/1988 | Bohannon |
| 4,929,973 A | * | 5/1990 | Nakatani ................... 248/177.1 |
| 5,074,662 A | | 12/1991 | Sullivan |
| 5,098,182 A | | 3/1992 | Brown |
| 5,322,251 A | | 6/1994 | Schumer et al. |
| 5,673,905 A | * | 10/1997 | Kiene ........................... 269/238 |
| 5,737,657 A | | 4/1998 | Paddock et al. |
| 5,806,734 A | | 9/1998 | Scott |
| 5,870,641 A | | 2/1999 | Chrosziel |
| 5,908,181 A | | 6/1999 | Valles-Navarro |
| 6,042,277 A | | 3/2000 | Errington |
| 6,435,738 B1 | | 8/2002 | Vogt |
| 6,663,299 B1 | | 12/2003 | Shupak |
| 6,773,172 B1 | | 8/2004 | Johnson et al. |
| 6,827,319 B2 | | 12/2004 | Mayr |
| 6,988,846 B2 | | 1/2006 | Vogt |
| 7,077,582 B2 | * | 7/2006 | Johnson ......................... 396/428 |
| 7,178,997 B2 | | 2/2007 | Claudi et al. |
| 7,185,862 B1 | | 3/2007 | Yang |
| D591,325 S | | 4/2009 | Dordick |
| 7,588,376 B2 | | 9/2009 | Friedrich |
| 7,658,556 B2 | * | 2/2010 | Johnson ......................... 396/428 |
| 7,823,316 B2 | | 11/2010 | Storch et al. |
| 8,075,203 B2 | | 12/2011 | Johnson |
| 8,109,681 B2 | | 2/2012 | McAnulty |
| 8,267,361 B1 | | 9/2012 | Dordick |
| 8,348,214 B2 | * | 1/2013 | Vogt ............................. 248/316.4 |
| 8,628,258 B2 | * | 1/2014 | Vogt ............................... 396/428 |
| 2003/0194268 A1 | | 10/2003 | Vogt |
| 2005/0041966 A1 | | 2/2005 | Johnson |
| 2006/0177215 A1 | | 8/2006 | Johnson |
| 2007/0031143 A1 | | 2/2007 | Piccardi |
| 2010/0181454 A1 | | 7/2010 | Vogt |
| 2011/0006170 A1 | * | 1/2011 | Liu et al. ....................... 248/121 |
| 2013/0108255 A1 | * | 5/2013 | Vogt ............................... 396/428 |

FOREIGN PATENT DOCUMENTS

| | | |
|---|---|---|
| DE | 29613027 U1 | 11/1996 |
| DE | 20203018 U1 | 5/2002 |
| DE | 20211351 U1 | 1/2003 |
| DE | 10329224 B3 | 10/2005 |
| EP | 0323550 A1 | 7/1989 |
| EP | 1160499 A1 | 12/2001 |
| EP | 1365187 A1 | 11/2003 |
| EP | 0982613 B1 | 1/2004 |
| EP | 1893906 B1 | 8/2008 |
| JP | 2009296349 A | 12/2009 |
| WO | 2008028351 A1 | 3/2008 |
| WO | 2009016116 A1 | 2/2009 |

OTHER PUBLICATIONS

International Search Report and Written Opinion of the ISA from corresponding Patent Cooperation Treaty (PCT) Application No. PCT/EP2010/061356, mailed Nov. 8, 2010.

International Preliminary Examination Report of the ISA from corresponding Patent Cooperation Treaty (PCT) Application No. PCT/EP2010/061356, mailed Nov. 15, 2011.

Translation of International Preliminary Examination Report from corresponding Patent Cooperation Treaty (PCT) Application No. PCT/EP2010/061356.

* cited by examiner

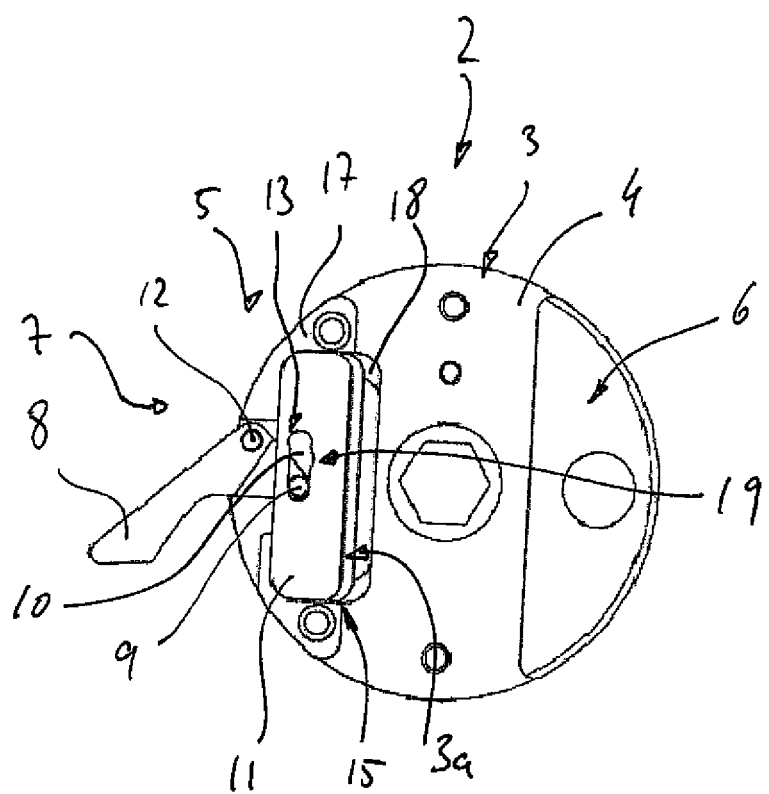

QUICK CLAMPING APPARATUS FOR OPTICAL DEVICES

BACKGROUND OF THE INVENTION

The invention relates to a quick clamping apparatus for clamping a quick change plate for an optical device into a guide on a base plate, wherein the quick change plate and the guide have complementarily formed guide surfaces, the guide has retaining elements, which can be adjusted relative to each other, and an apparatus is provided for fixing the quick change plate, which is formed to adjust the distance of the retaining elements with respect to each other.

Devices for fixing an optical device, also called quick clamping apparatuses, serve in particular to fix reflex cameras to a tripod head (base plate) via adapter or quick change plates, wherein this is accomplished in such a way that the adapter plate is screwed to the camera and the adapter plate is releasably fixed on a guide on the base plate on the tripod head. In order to achieve this, the adapter plate is usually clamped in the guide, for which purpose the opposing sides of the guide are formed so as to be movable relative to each other. The clamping process is carried out via a screw or a lever, which appropriately reduce the spacing between the parts of the guide for fixing purposes or increase it for release purposes.

With these devices it is possible to change quickly between different cameras which each have a corresponding adapter plate. This is of interest particularly in the area of professional photography.

EP 0 982 613 A1 discloses, e.g. a corresponding device for fixing an optical device with a guide rail on a support part, with a first member which is connected to the support part and with a second member which can be adjusted relative to the first member and with a device for fixing the guide rail which is connected to the first member and passes through the second member. The apparatus also has a locking member and a lever with a spring-biased retaining device, which lever is pivotably mounted on the locking member and lies against the second member in such a way that, in a first position, the lever fixes the optical device, in a second position, the lever releases the optical device for displacement and, in a third position, the lever releases the optical device for removal.

From EP 1 893 906 B1 a quick mounting device for video and photographic equipment is also known, comprising a first fastening element in the form of a plate which can be fastened to the equipment, and a second fastening element with a receiver for the plate, which can be fastened to a support head for the equipment, wherein the second element includes an apparatus for retaining the plate in the receiver, which comes into engagement with an edge of the plate in order to retain it in the receiver, a cam presser which is disposed in the receiver opposite the retaining apparatus in order to press the edge of the plate against the retaining apparatus, and a safety device to prevent unintentional release of the presser. The safety device also includes a spring-loaded arm which can be inclined in the receiver relative to the plane of the receiver and has a stop tooth which acts on the presser, wherein the tooth includes a run-up surface with an inclined plane in the part facing the receiver, and a stop shoulder on the opposite part, wherein the presser includes a projection which can travel over the tooth which moves from a position against the run-up surface to a position against the shoulder during transition from a position in which the plate is released, in which it can be removed from the receiver, to a locked position in which the plate is locked in the receiver.

The mechanism for adjusting and fixing the spacing of the parts of the guide rail or the receiver and presser, which can move relative to each other, is of an elaborate design in both the embodiments mentioned above.

From US 2005/0041966 A1 an apparatus for fixing a quick change plate is known, in which the quick change plate is clamped in between two retaining elements, wherein one retaining element is formed to be movable in a displacement direction with respect to the second retaining element and is spring-biased. For adjustment purposes, a lever with a stop surface is used to move this movable retaining element against the spring tension and to lock it.

From EP 1 365 187 A1 a device for quickly fixing a connection plate fastened to a device on a tripod head is known, which tripod head has a groove on the upper side, into which the connection plate can be inserted with one side, and has a clamping jaw, which grasps the opposing side of the connection plate in the closed position. The clamping jaw is able to tilt about a connection plate plane, is fastened to a slide which can be displaced by pressure with the connection plate against a spring force and can be locked in the closed position by a bolt which is spring loaded into the entry position.

From U.S. Pat. No. 5,737,657 A a quick clamping device is also known, with which a quick change plate is firmly held laterally with the aid of a lever. The lever presses against the adjustable retaining block with its outer periphery which is formed non-uniformly with respect to its point of rotation.

There is therefore the desire to have a quick clamping apparatus for optical devices, which is of simpler construction and can therefore be produced in a more reliable and inexpensive manner.

SUMMARY OF THE INVENTION

This object is achieved by the quick clamping apparatus in accordance with the present invention, an embodiment of which comprises a quick clamping apparatus for clamping a quick change plate of an optical device into a guide on a base plate, wherein the quick change plate and the guide have complementarily formed guide surfaces, the guide has first and second retaining elements, which can be adjusted relative to each other, and an apparatus is provided for fixing the quick change plate, which is formed to adjust the distance of the retaining elements with respect to each other, wherein the apparatus for fixing the quick change plate includes a lever which engages with a cam in a slotted link which is disposed in the first retaining element in such a way that a movement of the lever adjusts the first retaining element relative to the second retaining element.

Owing to the fact that the apparatus for fixing the quick change plate includes a lever which engages with a cam in a slotted link which is disposed in the first retaining element in such a way that a movement of the lever adjusts the first retaining element relative to the second retaining element, the quick clamping apparatus is, on the one hand, of simple mechanical construction and is, on the other hand, simple and reliable to handle.

The quick clamping apparatus normally has three settings or positions, namely a first position in which the lever fixes the optical device or the quick change plate, a second position in which it releases the optical device or the quick change plate for displacement in the guide, and a third position in which it releases the optical device or the quick change plate for removal.

In order to make or keep the respective positions "identifiable" for the user, the slotted link can be provided with a recess at one end in order to receive the cam in the fixing position, and with a recess disposed approximately centrally in the longitudinal direction in order to receive the cam in the displacement position.

The second retaining element is in a particular embodiment formed by the guide and its guide surface, which rise on one side of the base plate. They thus form a part of the base plate. The second retaining element is formed in a stationary manner.

As a guide surface the second retaining element has an undercut. The first retaining element also has an undercut. They can therefore together form a dove-tailed guide surface to receive a corresponding counterpart piece in the form of the quick change plate.

In contrast, the first retaining element is formed to be movable in order to change the distance with respect to the second retaining element. For this purpose the first retaining element includes a block which can move in the adjustment direction and which is formed with a guide surface on one long side. This block is in a particular embodiment formed from synthetic material and thus changes the distance between the two guide surfaces of the retaining elements.

The block may be usefully spring-biased in the adjustment movement, i.e. it is pressed by a spring in the adjustment direction, such as in the direction of the opposing second retaining element.

The block is moveably received in a guide in the preferred embodiment. The guide can be formed by a cover, lateral protrusions and an indentation in the base plate. In particular, in the case of an opposite arrangement in comparison to the second retaining element, the retaining elements are in a type of symmetrical arrangement.

The lateral protrusions and the indentation are in turn preferably parts of the base plate and the cover closes the guide in the upwards direction. The cover can consist, e.g., of metal, in particular aluminium, or synthetic material, whereas the base plate is usually produced from metal. Naturally, parts of the protrusions can also be attached to the cover or be formed therefrom.

If the cover is formed in a flexible manner and possibly the cam is produced from an elastic material, preferably an elastic metal, then in spite of retaining narrow tolerances and the recesses (see above) in the slotted link, gentle, smooth movement is achieved, since the necessary deflection of the cam for the change in position is achieved by the flexible cover and its intrinsic elasticity.

In a preferred embodiment, the lever is a two-armed angle lever, with the lever having a point of rotation at the connecting point of the two lever arms. In addition, the lever can have a shorter and a longer arm and be L-shaped.

It is useful if the cam is disposed on the end of the short arm.

If the base plate of the quick clamping apparatus is provided with knobs at each end of the guide, it is possible to prevent the quick change plate being unintentionally pushed out of the guide.

To this end, it is useful if, on its underside, the quick change plate has a groove, facing the base plate, in which the knobs are received or so that the plate can be pushed over the knobs. In addition, the quick change plate should have an element to prevent a pushing-out movement in order to prevent the plate being fully pushed out. This is usefully formed by the fastening screw provided in the usual manner, with which the quick change plate is fastened to the optical device.

Further advantages of the invention are given by the following description of an exemplified embodiment with reference to the accompanying drawings.

BRIEF DESCRIPTION OF THE DRAWINGS

FIG. 3 shows a plan view of the quick clamping apparatus of FIG. 1 in the displacement position with the cover removed and FIG. 4 shows a plan view of the quick clamping apparatus of FIG. 1 in the release position with the cover removed.

DESCRIPTION OF THE PREFERRED EMBODIMENTS

Figure 1:
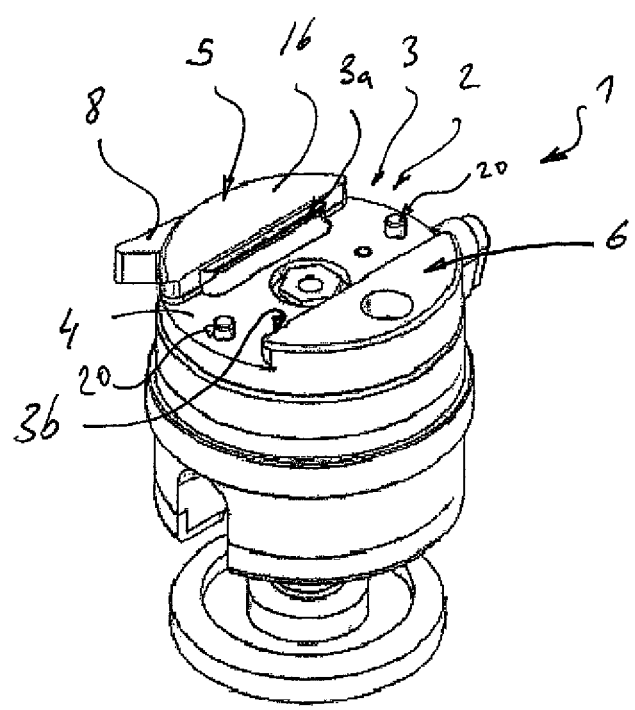
FIG. 1 shows a perspective view of a tripod head with a quick clamping apparatus in accordance with an embodiment of the invention.

The figures show a tripod head 1 which is formed with a quick clamping apparatus 2 for clamping a quick change plate (not shown) of an optical device into a guide 3 on a base plate 4.

The base plate 4 is of a circular shape when seen in plan. Retaining elements 5, 6 rise up in a block shape on opposite sides and between them the guide 3 is disposed approximately centrally.

The two retaining elements 5, 6 have, as guide surfaces 3a, 3b, mutually corresponding undercuts which together form an approximately dove-tailed guide surface. The guide 3 and the quick change plate have complementarily formed guide surfaces 3a, 3b.

The retaining elements 5, 6 are adjustable relative to each other and have an apparatus 7 for fixing the quick change plate. The apparatus 7 for fixing the quick change plate is formed in one retaining element 5 in order to adjust the spacing of the retaining elements 5, 6 or their guide surfaces 3a, 3b relative to each other.

In contrast, the second retaining element 6 is formed in a rigid or stationary manner.

For this purpose, the apparatus for fixing 7 the quick change plate has a lever 8 which engages with a cam 9 into an elongate slotted link 10 of a movable block 11. The slotted link 10 is disposed in the block 11 of the first retaining element 5 in such a way that a movement of the lever 8 about a point of rotation 12 adjusts the first retaining element 5 or the block 11 relative to the second retaining element 6, i.e. changes its spacing with respect thereto.

The block 11 which can move in the adjustment direction V forms the guide surface 3a on its inwardly directed long side. In contrast, the guide surface 3b of the second retaining element is simply formed by the rigid wall.

The movable block 11 is moveably received in a guide 15 which is formed by a cover 16, lateral protrusions 17 and an indentation 18 in the base plate 4. The cover is formed from flexible synthetic material.

The lever 8 is a two-armed angle lever which has a point of rotation 12 at the connection point of the two lever arms. The lever has a shorter and a longer arm and is thus approximately L-shaped. The cam is disposed on the end of the short arm and the longer arm is the actuating arm.

The cam is also produced from an elastic material, preferably an elastic metal.

Figure 2:
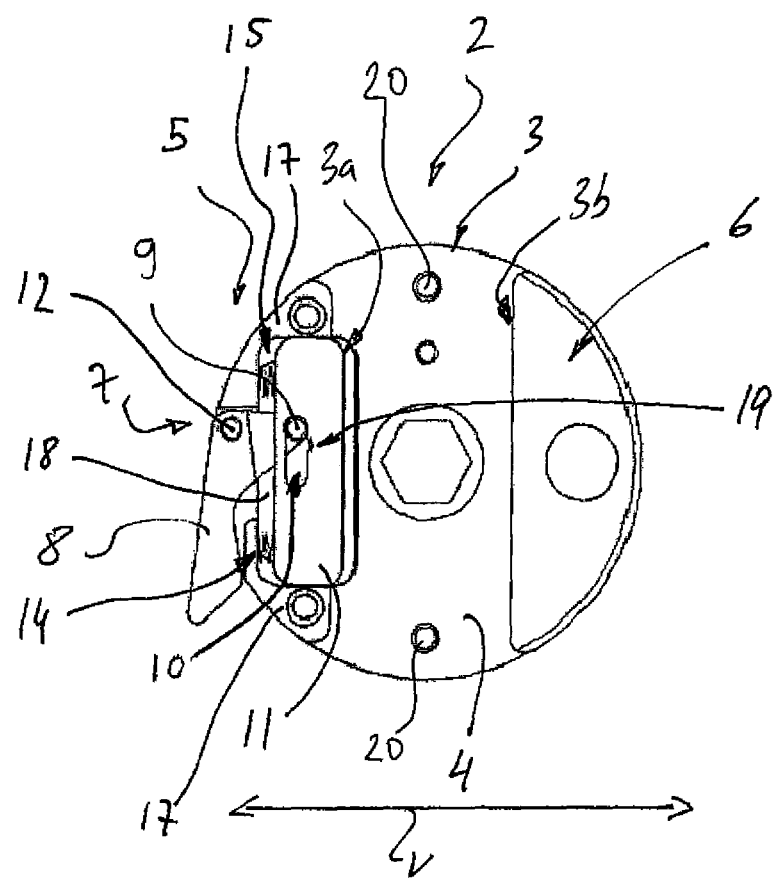
FIG. 2 shows a plan view of the quick clamping apparatus of FIG. 1 in the fixing position with the cover removed.
Figure 3:
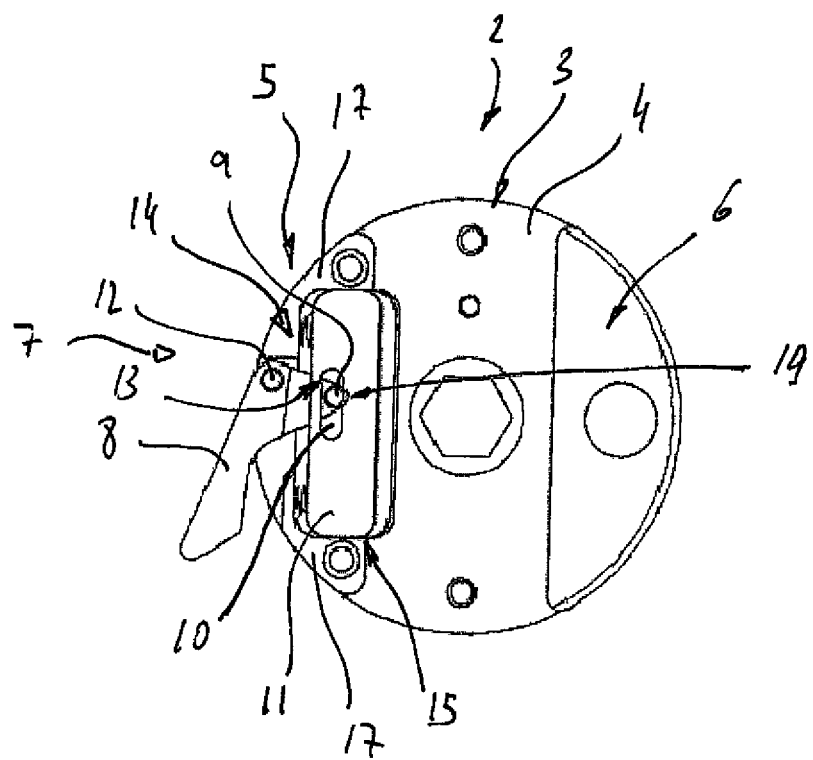

The lever 8 has a first position (cf. FIG. 2) in which the optical device or the quick change plate is fixed, a second position (cf. FIG. 3) in which the optical device or the quick change plate is released for displacement in the guide, and a third position (cf. FIG. 4) in which the optical device or the quick change plate is released for removal.

The slotted link 10 formed in an elongate manner transverse to the adjustment direction V is provided with a recess 13 or widening at one end in order to receive the cam 9 in the fixing position (FIG. 2) and to lock the block 11 at that location. For this purpose, the apparatus for fixing 7 the quick change plate comprises the spring 14 which urges the block 11 in the direction of the second retaining element 6 so that the cam 9, upon assuming the fixing position, slips into the outwardly oriented recess and remains there.

The slotted link is also provided with a further recess 19 or widening, which is oriented towards the guide 3 and disposed approximately centrally in the longitudinal direction, in order to receive or lock the cam 9 in the displacement position.

The elasticity of the cam 9 and of the cover 16 makes it possible that, in spite of retaining narrow tolerances and in spite of the recesses 13 and 19 in the slotted link 10, gentle, smooth movement is achieved, since the necessary deflection of the cam for the change in position out of the respective recess is permitted by the flexible cover and its intrinsic elasticity.

The figures also show the knobs 20 in the end region of the guide 3 of the base plate 4, which permit a displacement of the quick change plate over the knobs 20 in the guide 3 but, in conjunction with the fastening screw, prevent the quick change plate being pushed out. The fastening screw serves in the usual manner to fasten the quick change plate on an optical device, as shown e.g. in FIG. 1 of EP 0 982 613 A1. In contrast to this, in this case the quick change plate comprises a central groove on the side facing the base plate so that although the quick change plate can be pushed over the knobs 20, the guide cannot be exited since the fastening screw acts as an element preventing it being pushed out.

REFERENCE LIST 1 tripod head
2 quick clamping apparatus
3 guide
3a, b guide surface
4 base plate
5, 6 retaining element
7 fixing apparatus
8 lever
9 cam
10 slotted link
11 movable block
12 point of rotation
13 recess
14 spring
15 guide
16 cover
17 lateral protrusion
18 indentation
19 recess
20 knob
V adjusting direction

The invention claimed is:

1. Quick change plate-quick clamping apparatus comprising:
   a guide on a base plate for clamping a quick change plate of an optical device into the guide, wherein the quick change plate and the guide have complementarily formed guide surfaces, the guide has first and second retaining elements, which can be adjusted relative to each other, and
   an apparatus for fixing the quick change plate, which is formed to adjust a distance of the retaining elements with respect to each other, wherein the apparatus for fixing the quick change plate includes a lever which engages with a cam in a slotted link forming an elongate opening which is disposed in the first retaining element in such a way that a movement of the lever adjusts the first retaining element relative to the second retaining element,
   wherein, in a first position, the lever fixes the optical device, in a second position, the lever releases the optical device for displacement in the guide, and, in a third position, the lever releases the optical device for removal, and the slotted link is provided with a recess at one end in order to receive the cam in the first position.

2. Quick clamping apparatus as claimed in claim 1, wherein the second retaining element is formed by the guide and its guide surface which rise on one side of the base plate.

3. Quick clamping apparatus as claimed in claim 1, wherein the second retaining element has an undercut.

4. Quick clamping apparatus as claimed in claim 1, wherein the second retaining element is formed in a stationary manner.

5. Quick clamping apparatus as claimed in claim 1, wherein the first retaining element includes a block which can move in an adjustment direction and which is formed with a guide surface on one long side.

6. Quick clamping apparatus as claimed in claim 1, wherein the first retaining element has an undercut.

7. Quick clamping apparatus as claimed in claim 1, wherein the second retaining element forms, together with the first retaining element, a dove-tailed guide surface.

8. Quick clamping apparatus as claimed in claim 5, wherein the block is spring-biased in the adjustment direction.

9. Quick clamping apparatus as claimed in claim 5, wherein the block is moveably received in a block guide.

10. Quick clamping apparatus as claimed in claim 9, wherein the block guide of the movable block is formed by a cover, lateral protrusions and an indentation in the base plate.

11. Quick clamping apparatus as claimed in claim 10, wherein the cover is flexible.

12. Quick clamping apparatus as claimed in claim 1, wherein the lever is a two-armed angle lever.

13. Quick clamping apparatus as claimed in claim 1, wherein the cam is produced from an elastic material.

14. Quick clamping apparatus as claimed in claim 1, wherein the slotted link is provided with an additional recess disposed approximately centrally in the longitudinal direction, in order to receive the cam in the second position.

15. Quick clamping apparatus as claimed in claim 1, wherein the base plate of the quick clamping apparatus is provided with knobs at each end of the guide.

16. Quick clamping apparatus as claimed in claim 1, wherein the second retaining element is formed by the guide and its guide surface which rise on one side of the base plate, and wherein the second retaining element has an undercut.

17. Quick clamping apparatus as claimed in claim 16, wherein the second retaining element is formed in a stationary manner.

18. Quick clamping apparatus as claimed in claim 16, wherein the first retaining element includes a block which can move in an adjustment direction and which is formed with a guide surface on one long side, and wherein the first retaining element has an undercut.

19. Quick clamping apparatus as claimed in claim 1, wherein the first retaining element includes a block which can move in an adjustment direction and which is formed with a guide surface on one long side, and wherein the first retaining element has an undercut.

20. Quick clamping apparatus as claimed in claim 19, wherein the block is spring-biased in the adjustment direction, and wherein the block is moveably received in a block guide.

21. Quick clamping apparatus as claimed in claim 20, wherein the block guide of the movable block is formed by a cover, lateral protrusions and an indentation in the base plate.

* * * * *